United States Patent Office 3,433,874
Patented Mar. 18, 1969

3,433,874
PESTICIDAL USE OF BENZOTHIOPHENES AND BENZOTHIENOTHIOPHENES
Emil J. Geering, Grand Island, N.Y., assignor to Hooker Chemical Corporation, Niagara Falls, N.Y., a corporation of New York
No Drawing. Continuation-in-part of application Ser. No. 270,791, Apr. 5, 1963. This application Oct. 24, 1965, Ser. No. 505,033
U.S. Cl. 424—275    20 Claims
Int. Cl. A01n 9/12; C07d 63/18

ABSTRACT OF THE DISCLOSURE

Methods for controlling pests selected from the group consisting of fungi, bacteria, nematodes and insects with benzothiophenes and benzothienothiophenes.

---

This is a continuation-in-part of copending application Ser. No. 270,791, filed Apr. 5, 1963, now Patent Number 3,278,552.

This invention relates to the pesticidal use of compounds containing a thiophene ring fused to an aromatic ring or fused to an aromatic ring system, in particular thienothiophenes.

One aspect of the invention relates to the pesticidal use of compounds of the formula

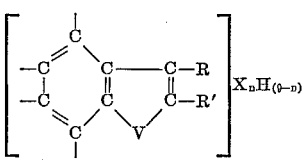

wherein one of the members R and R' is a phenyl radical, and the other member is chlorine, X is halogen, alkyl of 1 to 10 carbon atoms, or alkoxy of 1 to 10 carbon atoms, $n$ is a number from 1 to 9 and V is divalent sulfur or sulfonyl. Preferably, $n$ is a number from 1 to 4; more preferably $n$ is a number from 2 to 4. Preferably, V is divalent sulfur.

In another aspect, the invention relates to the fungicidal, bactericidal and nematocidal use of the compounds of the foregoing formula wherein $n$ is a number from 0 to 9, preferably wherein $n$ is a number from 0 to 4.

In a further aspect, the invention relates to the pesticidal use of compounds of the formulas

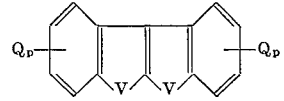

and

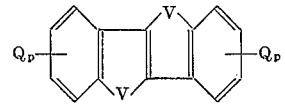

wherein Q is halogen, alkyl of 1 to 10 carbon atoms, alkoxy of 1 to 10 carbon atoms, or nitro, $p$ is a number from 0 to 4, and each V is divalent sulfur or sulfonyl. $p$ is preferably a number from 1 to 4, more preferably $p$ is a number from 1 to 2. V is preferably divalent sulfur.

Typical compounds of the invention which have fused thiophene ring systems are: 2,3-dichlorobenzo[b]thiophene; 2,3-dibromobenzo[b]thiophene; 2,3-difluorobenzo[b]thiophene; 2-chloro-3-phenylbenzo[b]thiophene; 2-phenyl-3-chlorobenzo[b]thiophene; 2-bromo-3-phenylbenzo[b]thiophene; 2-chloro-3(4-methylphenyl)benzo[b]thiophene; 2(4-methylphenyl)-3-chlorobenzo[b]thiophene; 2-chloro-3(4-chlorophenyl)benbenzo[b]thiophene; 2-chloro-3(4-methoxyphenyl)benzo[b]thiophene; 2,3-dichloronaptho[b]thiophene; 2,3,6-trichlorobenzo[b]thiophenes; 2,6-dichloro-3-(4-chlorophenyl)benzo[b]thiophene; 2-(2-chlorophenyl)-3,5-dichlorobenzo[b]thiophene; 2,3-dichloro-6-methylbenzo[b]thiophene, and the corresponding sulfones of the foregoing compounds such as 1,1-dioxa-2-chloro-3-phenylbenzo[b]thiophene.

Typical compounds of the invention which have the thienothiophene structure are: 2,3-dichlorothieno[2,3-b]thiophene; 2,3-dichlorobenzothieno[2,3-b]thiophene; 2,chloro-3(2-thienyl)thieno[3,2-b]thiophene; 2-chloro-3(3-[1]benzothienyl)thieno[3,2-b][1]benzothiophene 2,3-dichlorothieno[2,3-b :5,4-b']dithiophene; [1]benzothieno[2,3-b][1]benzothiophene; [1]benzothieno[3,2-b][1]benzothiophene; 1,10-dichloro[1]benzothieno[2,3-b][1]benzothiophene; 3,8-dibromo-[1]benzothieno[2,3-b][1]benzothiophene; 2,9-dimethyl-[1]benzothieno[2,3-b][1]benzothiophene; 3,8-dibutyl[1]benzothieno[2,3-b][1]benzothiophene; 4,7-dimethoxy-[1]benzothieno[2,3-b][1]benzothiophene; 3,8-dipropoxy-[1]benzothieno[2,3-b][1]benzothiophene; [1]benzothieno[2,3-b][1]naphtho[2,3-b]thiophene; [1]benzothieno[2,3-b]thieno[2,3-b]thiophene; [1]benzothieno[2,3-b]thieno[2,3-b:5,4-b']dithiophene; thieno[3,2-b]thieno[2,3-b:5,6-b'][1]dibenzothiophene; and the corresponding sulfones of the foregoing compounds.

As disclosed in the copending application SN 270,791, the foregoing compounds can be prepared by heating an initial starting material with sulfur. Included within the group of such initial starting materials are compounds having the formula:

(a)     

or (b)     

where X' is chlorine or bromine, Y' is hydrogen, chlorine, or bromine, Z' is chlorine or bromine or the radical (ArCX'$_2$—), where Ar is aryl or substituted aryl; and wherein X$^2$ is chlorine, bromide, fluorine, aryl, or substituted aryl, and wherein W is an aryl or substituted aryl substituent having a hydrogen atom adjacent the W-C bond.

Of the initial starting materials selected from group (a), the starting material is an ethane when Z' is the radical (ArCX'$_2$—), and in the other cases is a tri- or dihalo-substituted methyl group on an aryl nucleus which is converted to an ethane upon heating with sulfur. The initial starting materials selected from group $b$ are ethanes.

Of the initial starting materials of the formula

X' is preferably chlorine, Y' is preferably chlorine or hydrogen, and Z' is preferably chlorine. Typical compounds of the type are benzotrichloride; benzotribromide; trichloromethylanphthalene; trichloromethylthiophene; trichloromethylbenzo[b]thiophene; para-chlorobenzotrichloride; para-methylbenzotrichloride; para-methoxybenzotrichloride; para-propoxybenzotrichloride; benzaldichloride; benzaldibromide; para-chlorobenzaldichloride; para-propylbenzaldichloride; 1,2-diphenyltetrachloroethane; 1,2-diphenyltetrabromoethane; 1,2-bis(4-chlorophenyl)tetrachloroethane; 1,2-ditolyltetrachloroethane; 1,2-bis(4- methoxyphenyl)tetrachloroethane; 1,2-diphenyltrichloroethane; 1,2-diphenyltribromoethane, and 1,2-bis(4-chlorophenyl)trichloroethane.

As to initial starting materials of the formula

X' is preferably chlorine, and the choice of $X^2$ depends upon the end product desired. Typical compounds of the formula are phenyl-1,2,2,2-tetrachloroethane; phenyl-1,2,2,2 - tetrabromoethane; (1 - naphthyl)-1,2,2,2-tetrachloroethane; (2-thienyl)-1,2,2,2-tetrachloroethane; (2-benzo[b]thienyl) - 1,2,2,2-tetrachloroethane; diphenyl-2,2,2-trichloroethane; diphenyl-2,2,2-tribromoethane; phenyl(4-chlorophenyl) - 2,2,2-tribromoethane; bis(chlorophenyl)-2,2,2-trichloroethane; ditolyl-2,2,2-trichloroethane, and bis(4-methoxyphenyl)-2,2,2-trichloroethane.

Another class of starting materials for producing the thiophenes and thienothiophenes of the invention are the 1-aryl-2-haloethylenes wherein the aryl radical can be substituted and the halogen is chlorine or bromine. Suitable compounds of this type have the formula:

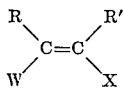

where W is an aryl or substituted aryl substituent having at least one position adjacent the W–C bond substituted by hydrogen, R and R' are fluorine, bromine chlorine, aryl or substituted aryl substituents or are atoms of an aromatic ring or ring system, and where X is chlorine or bromine. The aryl radical is one that is capable of undergoing the reaction without degradation. The most preferred aryl groups are phenyl, thienyl and benzothienyl, although naphthyl and anthracyl groups can also be employed. Referring to the formula

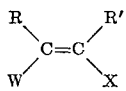

either R or R' is chlorine or bromine if the four ring nucleus is desired in the final product, and chlorine is most preferred, and at least one of R and R' is aryl or substituted aryl. Otherwise the choice of R and R' depends upon what is desired in the end product. X is preferably chlorine. Typical compounds of this type are phenyltrichloroethylene; phenyltribromoethylene; naphthyltrichloroethylene; thienyltrichloroethylene; benzothienyltrichloroethylene; 2,2-bis(2-thienyl) dichloroethylene; parachlorophenyltrichloroethylene; tolyltrichloroethylene; 1-phenyl-1-fluorochlorofluoroethylene; para-methoxyphenyltrichloroethylene; 2,2-diphenyldichloroethylene; 2,2-diphenyldibromoethylene; 1,2-diphenyldichloroethylene; 1,2-diphenyldibromoethylene; 2,2-bis(4-chlorophenyl)dichloroethylene; 2,2 - bis(4 - methoxyphenyl)dichloroethylene; 2,2 - ditolyldichloroethylene; 1,2 - bis(4-chlorophenyl)dichloroethylene; 1,2 - bis(4-methoxyphenyl)dichloroethylene; 1,2-ditolyldichloroethylene; 2-chlorobiphenyl; 2-bromobiphenyl; 2 - chlorobitolyl; 2,2'-dichlorobiphenyl; 2-chloro-4,4'-dimethoxybiphenyl; 2,4,4'-trichlorobiphenyl.

Various aryl groups which can undergo the conditions of the reaction without degradation are suitable as initial starting materials. The most preferred aryl groups are phenyl, thienyl and benzothienyl, but others such as naphthyl and anthracenyl can also be employed.

The aryl groups in both the intermediate and the initial starting materials can be substituted or unsubstituted. The substituent groups can include such groups as halogen, alkyl, or alkoxy.

In all the foregoing compounds, the halogen can be fluorine, bromine, chlorine or iodine; and the alkyl and alkoxy groups preferably contain 1 to 10 carbon atoms. The preferred substituents are chlorine, methyl and methoxy.

The reaction process is accomplished by heating a solution or suspension of sulfur in the starting material. The reaction can be considered to proceed through one or more stages, and the progress of the reactions can be followed by monitoring the evolution of $S_2Cl_2$ or HCl, as the case may be. These phenomena facilitate the control of the reactions to the production of the desired compounds on a commercial scale. The complete reaction of all sulfur-reactive groups is indicated by the cessation of the evolution of hydrogen halide.

The preferred temperature range for the processes of the invention is from about 100 to about 300 degrees centigrade. However, temperatures up to 400 degrees centigrade or even up to just below the decomposition temperature of the reactants and products can be used if desired. The reaction time can vary widely, but generally ranges from one or a few hours up to a day or more.

Various ratios of sulfur to starting materials can be used, and the preferred ratios are dependent on the starting materials and the desired end product. Thus when a substituted methane is converted to a benzothienobenzothiophene, up to about six moles of sulfur per mole of substituted methane can be employed. Generally, when intermediate ethylene compounds are converted to benzothiophenes or benzothienobenzothiophenes, the stoichiometric amount of sulfur can be employed.

The product can be separated and purified by distillation, crystallization, sublimation, and other equivalent processes known in the art, which will be more fully described in the examples to follow.

The following examples illustrate the preparation of the compounds used in the invention. Parts are by weight and temperatures are given in degrees centigrade unless indicated otherwise.

Example A

After heating, under a distillation column, a solution of 2355 grams (12 moles) of benzotrichloride and 1056 grams (33 moles) of sulfur at 215–270° centigrade for 12 hours the formation of hydrogen chloride and sulfur chlorides had ceased. The reaction mixture, heated at 250–300° centigrade, was then distilled at a pressure of 0.05–0.1 millimeters of mercury directly into a receiver to give 514 grams of crude product. The distillation residue was pulverized and then extracted with carbon tetrachloride in a Soxhlet apparatus to yield 169 grams of addition product, melting point 212.5°–213.5° centigrade, shown by infrared analyses, and corroborated by a determination of sulfur content, to be [1]benzothieno[3,2-b][1]benzothiophene.

*Analysis.*—Calculated for $C_{14}H_8S_2$: S, 26.68%. Found: 26.99%.

Example B

The mixture resulting from the reaction of 3822 grams (19.55 moles) of benzotrichloride and 941 grams (29.3 moles) of sulfur at 210–260° centigrade was fractionally distilled. Infrared analyses of the fractions established the following yields: recovered benzotrichloride, 761 grams (3.9 moles); 2-phenyl-3-chlorobenzo[b]thiophene, 1118 grams (4.57 moles); [1]benzothieno[3,2-b][1]benzothiophene, 84 grams (.345 moles); and tolane dichloride, 169 grams (.678 moles).

Example C

A solution of 40 grams (.129 mole) of bis(4-methoxyphenyl)-2,2-dichloroethylene and 4.16 grams of sulfur (.130 mole) was heated at 205–210° centigrade for 1.5 hours. Hydrogen chloride, 5.3 grams (145 moles) was collected. The reaction mixture was extracted with ten 75 milliliters portions of acetone. The residue, 34 grams remaining from the concentrations of the combined decolorizing charcoal treated extracts, was distilled in a short-path distillation apparatus at 110–165° centigrade/ two microns of mercury pressure. The distillate was triturated with heptane and the soluble portion, 1.03 grams after stripping, was redistilled in a molecular still at 95° centigrade and two microns of mercury pressure to give 0.36 gram of crude crystalline product which, after crystallization from isopropanol-acetone solution and recrystallization from ethanol-acetone solution, gave 0.1 gram of white product, melting point 181–181.5° centigrade, 3,8-dimethoxy[1]benzothieno[2,3-b][1]benzothiophene.

*Analysis.*—Calculated for $C_{16}H_{12}O_2S_2$: C, 63.98%; H, 4.03%; S, 21.33%. Found: C, 64.04%; H, 3.99%; S, 21.17%.

Example D

A solution of 50 grams (0.181 mole) of bis(p-tolyl)-2,2-dichloroethylene and 8.67 grams (0.271 mole) of sulfur was heated at 180–210° centigrade for four hours. Hydrogen chloride, 9.5 grams (0.26 mole) was collected. The reaction mixture was extracted with hot acetone and the acetone solution was treated with decolorizing charcoal and stripped to a residue. The residue was washed with hexane and then was sublimed under reduced pressure. The sublimate was crystallized from a solution of toluene and methanol and then was recrystallized from hexane to give a product melting at 147–148° centigrade.

*Analysis.*—Calculated for $C_{16}H_{12}S_2$: C, 71.60%; H, 4.51%; S, 23.89%. Found: C, 71.26%; H, 4.25%; S, 23.58%.

These analyses correspond to the calculated elemental composition of 3,8-dimethyl[1]-benzothieno[2,3-b][1]benzothiophene.

Example E

Hydrogen chloride, 53.5 grams (1.47 mole) was formed when a solution of 278 grams (0.784 mole) of DDT (bis(4 - chlorophenyl) - 2,2,2-trichloroethane) and 25.1 grams (0.784 mole) of sulfur was heated at 200–230° centigrade for eight hours. The reaction mixture after trituration with ethanol and then with methanol weighed 200 grams and was shown (infrared analysis) to contain 160 grams (0.51 mole) of 2,6-dichloro-3-(4-chlorophenyl)-benzo[b]thiophene and 30 grams (0.092 mole) of 3,8-dichloro[1]benzothieno[2,3-b][1]benzothiophene.

Example F

Using the procedure of Example E, the compound 2-chloro-3-phenylbenzo[b]thiophene is readily prepared from diphenyl-2,2,2-trichloroethane.

Example G

A solution of 354 grams (1.0 mole) of DDT and 64 grams (2.0 moles) of sulfur was heated at 230–250° centigrade for 17 hours. During this period, 95 grams (2.6 moles) of hydrogen chloride were evolved. The crude product was crystallized from xylene to give 196 grams of product. Further purification was effected by successive recrystallizations from xylene, chlorobenzene and chloroform to give a sample melting at 271–2° centigrade and having an elemental composition corresponding to 3,8-dichloro[1]benzothieno[2,3-b][1]benzothiophene.

*Analysis.*—Calculated for $C_{14}H_6Cl_2S_2$: C, 54.38%; H, 1.96%; Cl, 22.93%; S, 20.73%. Found: C, 53.77%; H, 2.12%; Cl, 23.15%; S, 20.56%.

Example H

A solution of 41.3 grams (0.148 mole) of (4-chlorophenyl)-1,2,2,2-tetrachloroethane and 4.7 grams (0.148 mole) of sulfur was heated at 210–240° centigrade until hydrogen chloride evolution had ceased (four hours). The residue was distilled. After removing a foreshot, 25.1 grams of distillate, which solidified on cooling, were collected at 52° centigrade and 0.025 millimeter of mercury pressure. After recrystallization from alcohol the distillate melted at 87–88° centigrade.

*Analysis.*—Calculated for $C_8H_3Cl_3S$: Cl, 44.8%; S, 13.5%. Found: Cl, 44.3%; S, 13.2%.

These analyses correspond to the calculated elemental composition of 2,3,6-trichlorobenzo[b]thiophene.

Example J.—Sulfone of [1]benzothieno[3,2-b][1]benzothiophene

A solution of 93 grams (0.38 mole) of [1]benzothieno[3,2-b][1]-benzothiophene, 930 milliliters of acetic acid, and 230 grams of a thirty percent solution of aqueous hydrogen peroxide was heated to its reflux temperature over a one-half hour period, held briefly at reflux, and then cooled. The product was filtered off, washed first with methanol and then with hexane, to yield 103 grams of material which was then recrystallized from toluene and analyzed.

*Analysis.*—Calculated for 5 - dioxy[1]benzothieno[3,2 - b][1]benzothiophene: C, 61.74%; H, 2.96%; S, 23.55%. Found: C, 61.7%; H, 3.36%, S, 23.03%.

Infrared analysis showed the presence of a sulfonyl group, indicating the structure to be:

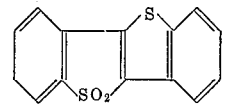

Example K

A solution of 385 grams (1.67 moles) of ortho-chlorobenzo-trichloride and 107 grams (3.35 moles) of sulfur was stirred and heated at 230 to 234 degrees centigrade for 13 hours. During the reaction period, hydrogen chloride and sulfur chloride were formed. The hydrogen chloride evolved from the reaction mixture and passed off as a gas. The sulfur chloride was distilled out of the reaction mixture through a 20-inch Vigreux column as it formed. The mixture was distilled, and 2-(2-chlorophenyl)-3,5-dichlorobenzo[b]thiophene was recovered by collecting 128 grams of product boiling at 142 to 183 degrees centigrade and 0.07 millimeters of mercury pressure.

Example L

Twelve gams (0.05 mole) of [1]benzothioeno[3,2-b]-[1]-benzothiophene were dissolved in a solution of 7.0 grams of nitric acid (density: 1.5) in one liter of acetic acid. The solution was concentrated by evaporation, and the resulting precipitated product was collected. And after recrystallization, the product melted at 287 degrees centigrade. The product was analyzed and found to contain 8.48 percent nitrogen, indicating that the following compound had been produced (calculated nitrogen content 8.49 percent):

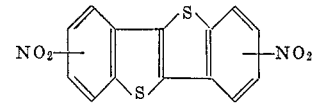

The following examples illustrate the pesticidal use of the compounds of the invention, but are not intended to limit the invention.

Example 1

2-phenyl-3-chlorobenzo[b]thiophene was chlorinated to a chlorine content of 31.6 percent, and 41.6 percent, corresponding to an average of 1.75 and 3.2 atoms of chlorine added per molecule, respectively.

Tomato plants infested with spores of *Alternaria solani*, the causative fungal organism of "early blight" disease, were sprayed with an aqueous dispersion of the test chemicals at concentrations of 0.04%. Similarly infested tomato plants were left unsprayed for comparison. Approximately one week later, when symptoms became evident on unsprayed plants, the degree of control on the sprayed plants was estimated by estimating the reduction in lesions on the sprayed plants and a substantial and significant degree of control was found to have been obtained with both chlorinated test chemicals.

Example 2

2-phenyl-3-chlorobenzo[b]thiophene was chlorinated to a total chlorine content of 41.6 percent, corresponding to an average of 3.2 atoms of chlorine added per molecule. When incorporated into nutrient agar at concentrations as low as 19 parts per million, it completely prevented development of bacterial colonies when the agar was inoculated with *Staphlacoccus aureus*.

Example 3

2-phenyl-3-chlorobenzo[b]thiophene was chlorinated to a total chlorine content of 38 percent, corresponding to an average of 2.63 atoms of chlorine added per molecule. When incorporated in soil infested with *Meloidogyne incognita* (nematodes) at the rate 125 parts per million, it completely prevented the appearance of "root knot" disease (which would otherwise have been caused by the nematode population) on cucumber seedings planted therein. Similar seedlings planted in the nematode- infested soil without prior chemical treatment were stunted and their roots were badly injured by nematode attack.

Example 4

The procedure of Example 3 was repeated with the compound 2-(2-chlorophenyl)-3,5-dichlorobenzo[b]thiophene and similar results were obtained.

Example 5

Soil infested with Pythium (a fungus which causes damping off of seedlings) was admixed to a 3.5 inch depth with 2-phenyl-3-chlorobenzo[b]thiophene at a rate of 64 pounds per acre. After 3 days, peas were planted in the treated soil. 80 percent emergence of healthy seedlings resulted. In the same infested soil without chemical treatment, no healthy seedlings could be grown because of damping off caused by the fungus.

Example 6

Adult pea aphids were sprayed with [1]benzothioeno [3,2-b][1]benzothiophene fromulated as a 0.1 percent solution until thoroughly wet and transferred to similarly sprayed pea plants. 48 hours later all the aphids were dead.

Example 7

Tomato plants infested with spores of *Alternaria solani*, the causative fungal organism of "early blight" disease were sprayed with an aqueous dispersion of 3,8-dichloro [1]benzothieno[2,3-b][1]benzothiophene at a concentration of 0.04 percent. Similarly infested tomato plants were left unsprayed for comparison. Approximately one week later, when symptoms were evident on the unsprayed plants, the degree of control of the sprayed plants was estimated by estimating the reduction in lesions. Substantial control was found to have been obtained, which was evident to a viewer.

Example 8

Tomato plants infested with spores of *Alternaria solani*, the causative fungal organism of "early blight" disease were sprayed with an aqeuous dispersion of the sulfone of Example J at a concentration of 0.04 percent. Similarly infested tomato plants were left unsprayed for comparison. Approximately one week later, when symptoms were evident on the unsprayed plants, substantial control was noted on the sprayed plants.

Example 9

The procedure of Example 8 was repeated with the compound of Example L. Nearly complete disease control was obtained with the compound of the invention.

Example 10

Soil infested with Pythium was admixed to a 3.5 inch depth with the compound [1]benzothieno[3,2-b][1]benzothiophene at the rate of 64 pounds per acre. After three days, peas were planted in the treated soil. The seeds germinated normally, and healthy seedlings resulted. In the same infested soil without chemical treatment, no healthy pea seedlings could be grown because of damping off caused by the fungus.

As shown in the preceding examples, the compounds of the invention are useful in a variety of applications requiring biological activity. Such activity includes utilty as fungcides, insecticides, bactericides, herbicides, and as plant growth regulators.

When compounds of the invention are utilized in controlling bacteria, the compound is brought into contact with the bacteria to be controlled in an amount sufficient to provide the desired control of the bacteria, e.g., a bactericidal amount. Typically, the compound is applied at a rate within the range of about 5 to 25 grams per square meter of the surface to be treated. However, either greater or lesser application rates can be used depending on the conditions that exist and the extent of control required. The compound of the invention can be applied to the area in which bacteria is to be controlled as an aqueous suspension or solution containing the compound in an amount in the range of 5 to about 50 percent by weight of the aqueous composition.

When compounds of the invention are applied as fungicides, the compound is employed in an amount sufficient to provide the desired control of the fungus, e.g., a fungicidal amount. The compounds are generally used at rates ranging from 0.05 to 100 pounds per acre. Very low rates, 0.05 to 1 pound per acre is sufficient when the compounds are utilized as seed treatment chemicals. Higher rates, 0.1 to 20 pounds per acre are used when a crop is treated in the field, such as in the application of sprays, dusts and granules. Rates up to 100 pounds per acre are utilized when it is necessary to treat an entire mass of soil to a considerable depth in heavily infested fields.

When compounds of the invention are applied as nematocides, the compound is employed in an amount to provide the desired control of the nematodes, e.g., a nematocidal amount. The compounds are generally used at rates ranging from 10 to 500 pounds per acre. However, higher and lower rates can be used depending on the type of application, e.g., seed treatment, fumigation and the like.

When compounds of the invention are utilized in the control of insects and other invertibrate pests, including mites, and many others, the compound is brought into contact with the pest to be controlled in an amount sufficient to provide the desired control, e.g., a pesticidal amount, and the like. Effective insecticidal concentrations are in the range from about 0.01 pound per acre to about 20 pounds per acre. In most crop applications, rates of 0.05 to 5 pounds per acre are employed. Lower rates are used on very susceptible species, while higher rates are used on extremely resistant species. The insecticidal compounds can be used in combination with a class of potentiators or synergists known in the insecticidal art as "knockdown agents." Other adjuvants useful in the compounds of the invention include odorants, colorants, stabilizers, and extending agents. The composition can be formulated as solids or liquids using solid or liquid solvent vehicles, carriers or extenders. The compounds can also be combined with other pesticidally active compounds.

The compounds can be used with other active agents such as insecticides, herbicides, fertilizers, plant growth regulators, and other fungicides and nematocides. The compounds can be used in the pure state or with suitable adjuvants, such as solvents, solid carriers, surfactants, synergists, colorants and odorants.

As disclosed hereinbefore, a typical starting material for producing the thiophenes and thienothiophenes used in the processes of the invention is benzotrichloride. In reaction with sulfur, this compound reacts in successive steps to form 1,2 - diphenyltetrachloroethane, 1,2 - diphenyldichloroethylene, 2 - phenyl - 3 - chlorobenzo[b]thiophene and [1]benzothieno[3,2-b][1]benzothiophene. However, it has been found that when the aromatic starting material is disubstituted, such as in the case of bis(trichloromethyl)

benzene, reactions with sulfur produce polymeric products of the following formulas:

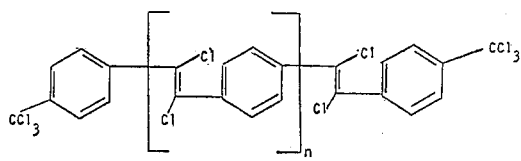

and

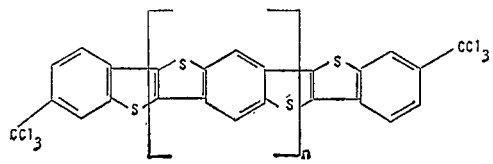

In a typical example, 25.95 parts by weight of bis (1,4-trichloromethyl)benzene were reacted with 13.31 parts of sulfur at a temperature of 225 to 275 degrees centigrade for two hours. A solid polymeric product was recovered from the reaction mixture. The polymer product was found to be thermally stable when tested at a temperature of 510 degrees centigrade. The product is useful as an insulation material for high temperature applications.

While this invention has been described with reference to certain specific embodiments, it will be recognized by those skilled in the art that many variations are possible without departing from the spirit and scope of the invention.

I claim:
1. A method for controlling pests selected from the group consisting of fungi, bacteria, nematodes and insects which comprises applying to the situs of the pest to be controlled a pesticidal amount of a compound having the formula:

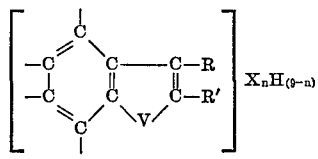

wherein one of the members R and R' is phenyl or substituted phenyl, wherein the substituents are selected from the group consisting of halogen, alkyl of 1 to 10 carbon atoms, and the other member is chlorine, X is halogen, alkyl of 1 to 10 carbon atoms, or alkoxy of 1 to 10 carbon atoms, V is divalent sulfur or sulfonyl, and $n$ is a number from 1 to 9.

2. The method of claim 1 wherein X is chlorine, $n$ is a number from 1 to 4 and V is divalent sulfur.
3. The method of claim 1 wherein the compound is 2-(2-chlorophenyl)-3,5-dichlorobenzo[b]thiophene.
4. The method of claim 1, wherein the pests are fungi.
5. The method of claim 4 wherein X is chlorine, $n$ is a number from 0 to 4 and V is divalent sulfur.
6. The method of claim 4 wherein the compound is 2-phenyl-3-chlorobenzo[b]thiophene and wherein said compound is applied at a rate of from about 0.05 to about 100 pounds per acre.
7. The method of claim 1, wherein the pests are bacteria.
8. The method of claim 7 wherein X is chlorine, $n$ is a number from 0 to 4 and V is divalent sulfur.
9. The method of claim 1, wherein the pests are nematodes.
10. The method of claim 9 wherein X is chlorine, $n$ is a number from 0 to 4 and V is divalent sulfur.
11. The method of claim 9 wherein the compound is 2-(2-chlorophenyl)-3,5-dichlorobenzo[b]thiophene and wherein said compound is applied at a rate of from about 10 to about 500 pounds per acre.

12. A method for controlling pests selected from the group consisting of fungi, bacteria, nematodes and insects which comprises applying to the situs of the pest to be controlled a pesticidal amount of a compound of the formula:

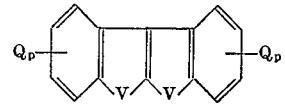

or

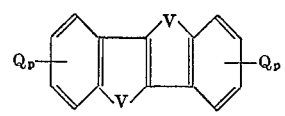

wherein Q is halogen, alkyl of 1 to 10 carbon atoms, alkoxy of 1 to 10 carbon atoms, or nitro, $p$ is a number from 0 to 4, and each V is divalent sulfur or sulfonyl.

13. The method of claim 12 wherein Q is chlorine, $p$ is a number from 0 to 2, and V is divalent sulfur.

14. A method for controlling insects which comprises applying to the situs of the insect to be controlled an insecticidal amount of a compound having the formula:

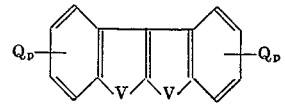

or

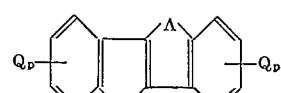

wherein Q is halogen, alkyl of 1 to 10 carbon atoms, alkoxy of 1 to 10 carbon atoms, or nitro, $p$ is a number from 0 to 4, and each V is divalent sulfur or sulfonyl.

15. The method of claim 14 wherein the compound is [1]benzothieno[3,2-b][1]benzothiophene and wherein said compound is applied at a rate of from about 0.01 pounds per acre to about 20 pounds per acre.

16. A method for controlling fungus which comprises applying to the situs of the fungus to be controlled a fungicidal amount of a compound of the formula:

or

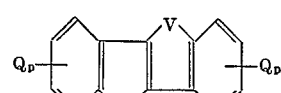

wherein Q is halogen, alkyl of 1 to 10 carbon atoms, alkoxy of 1 to 10 carbon atoms, or nitro, $p$ is a number from 0 to 4, and each V is divalent sulfur or sulfonyl.

17. The method of claim 16 wherein the compound is 3,8-dichloro[1]benzothieno[2,3-b][1]benzothiophene.

18. The method of claim 16 wherein the compound has the formula:

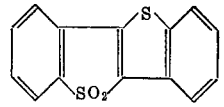

19. The method of claim 16 wherein the compound has the formula:

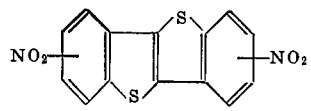

20. The method of claim 16 wherein the compound is [1]benzothieno[3,2-b][1]benzothiophene.

References Cited

UNITED STATES PATENTS 2,980,697  4/1961  Dann _____ 260—330.5

OTHER REFERENCES

Murthy et al., Jour. Scientific and Industrial Research, vol. 20B, No. 4 (April 1961), pp. 164–176.

Hartough et al., Compound with Condensed Thiophene Rings, Interscience Pub., Inc., New York (1954), pp. 385–6.

ALBERT T. MEYERS, *Primary Examiner.*

S. J. FRIEDMAN, *Assistant Examiner.*

U.S. Cl. X.R.

260—329.3, 330.5

PO-1050
(5/69)

UNITED STATES PATENT OFFICE
CERTIFICATE OF CORRECTION

Patent No. 3,433,874                    Dated    March 18, 1969

Inventor(s)    Emil J. Geering

It is certified that error appears in the above-identified patent and that said Letters Patent are hereby corrected as shown below:

Column 2, line 45, "bromide" should read -- bromine --. Column 8, line 47, insert after amount -- or an insecticidal amount, --. Column 9, line 48, Claim 1, insert after "atoms," -- and alkoxy of 1 to 10 carbon atoms --. Column 10, line 30, Claim 14, the formula should be corrected to read

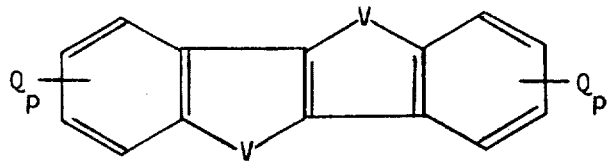

SIGNED AND
SEALED
AUG 25 1970

(SEAL)
Attest:

Edward M. Fletcher, Jr.
Attesting Officer

WILLIAM E. SCHUYLER, JR.
Commissioner of Patents